(12) United States Patent
Risley et al.

(10) Patent No.: US 6,332,158 B1
(45) Date of Patent: Dec. 18, 2001

(54) DOMAIN NAME SYSTEM LOOKUP ALLOWING INTELLIGENT CORRECTION OF SEARCHES AND PRESENTATION OF AUXILIARY INFORMATION

(76) Inventors: Chris Risley, 372 Stevick Dr., Atherton, CA (US) 94027; Richard Lamb, 11 Roxbury Ave., Natick, MA (US) 01760; Eduard Guzovsky, 11 Page Rd., Weston, MA (US) 02493

( * ) Notice: Subject to any disclaimer, the term of this patent is extended or adjusted under 35 U.S.C. 154(b) by 0 days.

(21) Appl. No.: 09/207,701

(22) Filed: Dec. 9, 1998

Related U.S. Application Data

(63) Continuation-in-part of application No. 09/204,855, filed on Dec. 3, 1998, now abandoned.

(51) Int. Cl.[7] .................................................. G06F 13/00
(52) U.S. Cl. ..................... 709/219; 709/225; 709/313; 709/329
(58) Field of Search ..................................... 709/217, 219, 709/223, 224, 225, 226, 227, 229, 313, 328, 329

(56) References Cited

U.S. PATENT DOCUMENTS

| | | | |
|---|---|---|---|
| 5,855,020 | * | 12/1998 | Kirsch ..................................... 707/10 |
| 5,907,680 | * | 5/1999 | Nielsen ................................. 707/533 |
| 6,041,041 | * | 3/2000 | Ramanathan et al. ................ 370/241 |
| 6,041,324 | * | 3/2000 | Earl et al. ................................. 707/9 |
| 6,092,178 | * | 7/2000 | Jindal et al. ............................ 712/27 |

* cited by examiner

*Primary Examiner*—Viet D. Vu
(74) *Attorney, Agent, or Firm*—Townsend and Townsend and Crew LLP; Charles L. Kulas; Fidel D. Nwamu

(57) ABSTRACT

A domain name server assists user's in selecting desired domains in the Internet. A domain name query is sent from a resolver process, or equivalent process, when the user (or a process on the user's computer) wishes to obtain information. If the domain name exists, the domain name server provides the corresponding machine address back to the user's computer. However, when the domain name query uses a non-existent domain name then a machine address for a computer that executes a domain recommendation engine is returned instead of a machine address associated with the invalid domain. The domain recommendation engine assists the user (or process on the user's computer) in locating a desired domain name. The domain name recommendation engine can take into account numerous factors that assist in determining the intended domain, including common misspellings, phonetic errors, sub-domain errors, past statistics on website accessing by the present user and prior users. Auxiliary information is provided to the user along with information to assist in locating the intended domain. The auxiliary information can include sponsorship information, referrals, advertisements, educational or other information. The auxiliary information can be in the form of image, audio, database of other types of information.

22 Claims, 7 Drawing Sheets

Domain-Seek Internet Spellchecker http://www.infosadsaseek.com/Home is an invalid URL.

Try clicking on one of the following URL's instead.
http://www.infoseek.com
http://www.altavista.digital.com This service sponsored by Nevod Incorporated.
The Time Is: Mon Aug 10 06:44:49 1998
Copyright © 1998 Domain-Seek Incorporated. All Rights Reserved.

DOMAIN NAME SYSTEM LOOKUP ALLOWING INTELLIGENT CORRECTION OF SEARCHES AND PRESENTATION OF AUXILIARY INFORMATION

CROSS REFERENCE TO RELATED APPLICATION

This application is a Continuation-in-Part of U.S. application Ser. No. 09/204,855, filed Dec. 3, 1998, now abandoned entitled DOMAIN NAME SYSTEM LOOKUP ALLOWING INTELLIGENT CORRECTION OF SEARCHES AND PRESENTATION OF AUXILIARY INFORMATION the specification if which in incorporated by reference herein for all purposes.

COPYRIGHT NOTICE

A portion of the disclosure recited in this application contains material which is subject to copyright protection. Specifically, a "computer program listing appendix" in accordance with 37 CFR Section 1.96 is included that lists source code instructions for a process by which the present invention is practiced in a computer system. The copyright owner has no objection to the facsimile reproduction of the specification as filed in the Patent and Trademark Office. Otherwise all copyright rights are reserved. The source code is provided on a compact disk-read only memory (CD-ROM) in accordance with recent Patent and Trademark Office guidelines.

INCORPORATION BY REFERENCE

The present application includes a Compact Disc Read Only Memory (CD-ROM) containing the following files and byte sizes: Figs, 120 KB; risley patent, 79.5 KB; and risley source code, 67.0 KB which is hereby incorporated by reference as if set forth in full in the present invention.

BACKGROUND OF THE INVENTION

The Domain Name System (DNS) is an integral part of the Internet and other networks that use Internet-type protocols (such as TCP/IP) and architecture similar to the Internet. DNS allows human users to access information on different computers connected to the Internet by typing, entering, selecting or otherwise specifying, text names as opposed to sequences of numbers. This makes it much easier to remember, access and convey the location of information in the vast Internet. For example, "coolsite.com" is generally more appealing to the average user of the Internet than "199.227.249.232." An analogy is in the use of names of people and places as opposed to being forced to use purely numeric telephone numbers.

However, computers on the Internet execute software that uses machine addresses to access information instead of the mnemonic text domain names. Because of this, the domain names must be mapped to their machine addresses (e.g., "coolsite.com" must be mapped to 192.86.1.90 in the example above) before information at a site or location can be accessed. The mechanism that DNS uses to perform this mapping is a client-server arrangement between a name server and a client resolver. Both the name server and resolver are software processes executing on one or more computers. Essentially, the resolver submits a query to a name server about a domain name. The name server "resolves" the mapping of the domain name to a machine address and sends the machine address back to the resolver as the "answer" to the query. For a detailed discussion of the operation of name servers, routers and DNS in general, see, for example, *DNS and BIND,* by Paul Albitz and Cricket Liu, published by O'Reilly & Associates, Inc.

FIG. 1A illustrates a DNS lookup, also called a "mapping" or "resolving" of a domain name to a machine address, as performed in the prior art.

In FIG. 1A, computer 10 makes a request of computer 12. Computer 12 forms part of the Internet and, in particular, is a name server within the DNS. For example the request from computer 10 may come from a Web browser application executing on computer 10. In response to computer 10's user typing in a domain name such as "www.bessemer_ventures.com," resolver code used by the browser transmits the domain name query to computer 12. This assumes that computer 12 has been predesignated as the primary domain name server for computer 10.

Computer 12 includes DNS name server software that receives the request. One method of DNS lookup allows computer 12 to check a local list of domain names already matched to machine addresses. If the queried domain name is in the local list then computer 12 can respond with an answer, in the form of the associated machine address, immediately. Such a local list is referred to as a "name cache" that is stored in system random access memory (RAM), disk storage or other storage associated with computer 12. The name cache is updated periodically from other, authoritative, name servers in the Internet.

Assuming computer 12 does not have a match for the queried domain name in computer 12's name cache, computer 12 begins a process of querying other name servers in the Internet, such as computers 14, 16 and 18, for knowledge of the associated machine address. This querying is organized but takes time because of the limitations of the Internet and the ever-increasing number of domain name queries that need to be handled by a limited number of name servers. For a detailed discussion of DNS lookup, see the above reference. After computer 12 has obtained the machine address associated with the domain name www.bessemer_ventures.com, the machine address, 180.201.15.250, in this case, is passed back to computer 10 as the answer to computer 10's domain name query. Note that this can take on the order of a few seconds, especially where the queried domain name does not exist in primary domain name server computer 12's name cache. Also, the necessity of computer 12 then having to query, sometimes several or many, other name servers adds to the overall Internet traffic and consumption of limited domain name server processing resources. This results in a slower DNS response time for all users of the Internet. Since DNS lookup is a requirement in the large majority of web page accesses, this translates into a slower Internet for users throughout the world.

After computer 10 receives the machine address associated with www.bessemer_ventures.com, it may then use the machine address to communicate with the target computer having the machine address. Note that the target computer can be any computer connected to the Internet. This does not have to be (and typically isn't) the primary domain name server, such as computer 12. Rather, the target computer is one operated by the provider of information that the user desires and might be located halfway around the world from the user's primary name server. For example, in the present example of a web browser executing on the user's computer 10, after the user types in the domain name and the browser (via the resolver process) receives the machine address, the next action is to transfer a request to the target machine's address for a specific web page to be displayed on the user's computer 10.

The process of obtaining a web page is shown in FIG. 1A as taking four steps. However, this is merely a symbolic depiction for ease of discussion. All of the communication steps typically occur over a single physical transmission line from a user's computer to an Internet server, switch, backbone, router or other network device. In accomplishing the process of mapping a domain name to a machine address there are many transactions occurring at different communication layers.

The DNS approach to resolving a domain name with an associated machine address is flexible in that it allows independent growth and relatively automatic propagation of new domain names and their associated machine addresses throughout the Internet. However, the resolution time can become unacceptably long, as where multiple, overloaded name servers must be queried in order to obtain the associated machine address. This problem is exacerbated when the domain name that is the subject of a query does not exist within DNS. This can occur, for example, when a user misspells a domain name, when a user has remembered an incorrect domain name, when an outdated domain name is used, where an error occurs in a software program or database, etc.

In the prior art DNS, when a non-existent domain name is queried for the first time it will not be present in the name cache of the primary domain name server. This starts a chain of potentially many queries to additional name servers—each of which will result in no associated machine address for the domain name. The number of queries depends on the type of DNS searching that is performed and on how many sub-domains in the full domain name are valid before an invalid sub-domain is determined. Even where the domain name may exist, there may be other reasons that a connection can not be made, such as when the web server for the domain is down. Basically, long delays occur any time the underlying protocol, i.e., TCP or UDP, is having problems.

FIG. 1B illustrates the prior art's handling of valid and invalid domain name queries.

In FIG. 1B, client side processing, such as is performed on a user's machine when the user is operating a web browser, is shown at 20. DNS name server processing is shown in the box at 22.

The flowchart of FIG. 1B is entered at 24 where it is assumed that a user is executing an application, such as an Internet browser, that allows a Uniform Resource Locator (URL) to be specified by the user for purposes of accessing information. At step 26, the user enters a domain name. Usually the user types the domain name by using the keyboard. Other ways of entering domain names are by clicking on a hyperlink to a domain name, having the domain name automatically provided by software, etc. While most requests for invalid domain name searches are the result of a user misspelling, or other user mistake, errors can also occur when domain names are obtained by other means. An example is when a previously valid domain name becomes defunct, when the user has been emailed an invalid domain name, etc.

At step 30, the browser extracts the domain name from the URL, forms a DNS domain name query and sends the query to a pre-designated name server. At step 28, the name server receives the query and attempts to resolve the domain name. The name server begins by examining its local cache of pre-stored known domain names and associated machine addresses. Typically the name server has received a master list of domain names from a master domain name server, or "root" server. Such lists can be updated every day or so. The list resides in cache, either system RAM or local disk storage, for a predetermined period of time until it is scrapped in favor of another master list. Updates to the cache can also come from the name server's own discoveries about names in DNS as the name server operates and attempts to resolve queries.

At step 32, if the domain name is in the cache then the name server checks, at step 40, to determine whether there is a valid machine address associated with the domain name. If so, the machine address is returned to the client (browser application). The browser application uses the returned machine address to access the domain at step 46. This typically results in the desired information being displayed on the user's computer in the form of a web page. At this point the user has successfully obtained the desired information and the transaction completes at step 50.

Assuming that the queried domain name does not reside in the cache at step 32, step 42 is performed to send a further query to authoritative domain name servers on the Internet in an attempt to resolve the initial query. If a successful resolution is obtained from external name servers, the domain name and associated machine address are stored in the cache and the machine address is returned to the browser at step 46, as before. This represents a successful resolution of the domain name so the desired information is ultimately obtained and displayed on the user's screen. If, however, the query request at step 42 does not return a machine address associated with the domain name, the check at step 48 fails and step 54 is executed to store the domain name in the cache and flag the domain name as invalid. Step 53 sends notification of the failed query to the browser.

At step 52, the browser receives notification of the failed DNS query and displays an error message. Step 44 represents the cycle of the user trying a different domain name in an unassisted attempt to locate the desired information in the desired, and possibly unknown (to the user), domain.

DNS requires that the domain name be exactly correct or it may map to an unintended domain or be invalid (non-existent) and fail to map to a machine address. This is becoming more of a problem as the number of domains increases and the commercial, educational, governmental and other activity on the Internet increases. Since domain names are a concatenation of domains names of different levels, the user will often remember some of the names of the levels and misspell, or remember incorrectly, other levels. For example, the domain "www.berkeley.com" is an invalid domain name. One that might easily be entered by a user who is familiar with the much-publicized ".com" extension for Web sites but who is unfamiliar with the lesser-known ".edu" domain that is designed for educational Internet uses. Typically, the user receives a terse error message that the "domain cannot be located," the domain is "not found," or the like. These types of errors, unlike simple spelling errors that the user may be in a position to correct, given a second try, may delay the user for a long time. The user may wait on the order of 20 seconds before an error notification is displayed when a domain name is invalid.

A recent study revealed that 3%–4% of DNS queries are invalid and, as a result, are not resolved. Probably nearly all of these invalid queries are because of a user's mistake. Thus, it is apparent that an improved name server system for assisting user's who have requested an invalid domain name lookup is desirable. Further, the ability to create an improved DNS service, such as a name server service, that improves the Internet such as by providing faster overall DNS performance, distribution of useful information and promotion of commerce, is desirable.

SUMMARY OF THE INVENTION

The present invention provides a system including a domain name server that assists user's in selecting desired domains in the Internet. A domain name query is sent from a resolver process, or equivalent process, when the user (or a process on the user's computer) wishes to obtain information. If the domain name exists, the domain name server provides the corresponding machine address back to the user's computer. However, when the domain name query uses a non-existent domain name then a machine address for a computer that executes a domain recommendation engine (DRE) is provided. The domain recommendation engine assists the user (or process on the user's computer) in locating a desired domain name.

One aspect of the system uses the domain recommendation engine to display a list of suggested domain names that have a high likelihood of being the domain name that the user intended. The relationship of the suggested domain names to the invalid domain name include names with slight spelling corrections, or changes; phonetically similar names; names where a portion of the name (e.g., a sub-domain) is changed; and names that have a high likelihood of being the intended domain based on a collection and analysis of past domain name searches—either by the presently requesting user or by other users.

Another aspect of the system provides for auxiliary information to be provided on a page of information that reports the invalid domain name to the user. The auxiliary information can be provided in conjunction with the list of suggested domain names as described above. The auxiliary information can include sponsorship information, referrals, advertisements, educational or other information. The auxiliary information can be in the form of image, audio, text, numeric, hypertext or other types of information. The auxiliary information can be associated with the invalid domain name, as where the invalid domain name is used to identify a category of interest for the user and sponsorship information in the same category of interest is provided.

Another aspect of the system causes a display of the invalid domain name on the user's computer with an invalid, or likely invalid, portion of the domain name indicated.

One embodiment of the invention provides a method for handling invalid domain name lookup requests in the Internet, wherein a domain name server receives a domain name request from a user's computer. The method includes steps of determining that the domain name request specifies a non-existent target domain name; and using the domain name server to assist the user in selecting a desired domain name.

DESCRIPTION OF THE SPECIFIC EMBODIMENTS

A preferred embodiment of the invention is implemented as the "Modified Domain Name System" (MDNS) manufactured by Need Incorporated. Source code for this system is included in the computer program listing appendix which should be consulted for detailed information about the invention in conjunction with this specification. The DNS name server of the present invention (the "SuperDNS" server) incorporates the popular Berkeley Internet Name Domain (BIND) code. A preferred embodiment of the invention uses the Internet Software Consortium (ISC) BIND Version 8.1.2 available at http:/www.isc.org/bind/html. The computer program listing appendix includes those routines particular to the invention that work in connection with the BIND code instructions to achieve the functionality of the invention. Specifically, routine nv-rewrite( ) in the computer program listing appendix is called from send-msg( ) in ns-resp.c and nsreq( ) in ns-req.c. and routine.

A loose, but critical linkage between the modified BIND and the web servers and spell checkers is also carried out by nv-rewrite( ). A message is sent out to these devices to give them a head start in creating the web pages that shall contain the "suggested" correct spellings and sites. The c-coded cgi routine in the computer program listing appendix which runs on the specialized web server picks up the information left by the spell checkers and matches it up with the subsequent web pate request coming from the initiating browser.

Figure 1A:
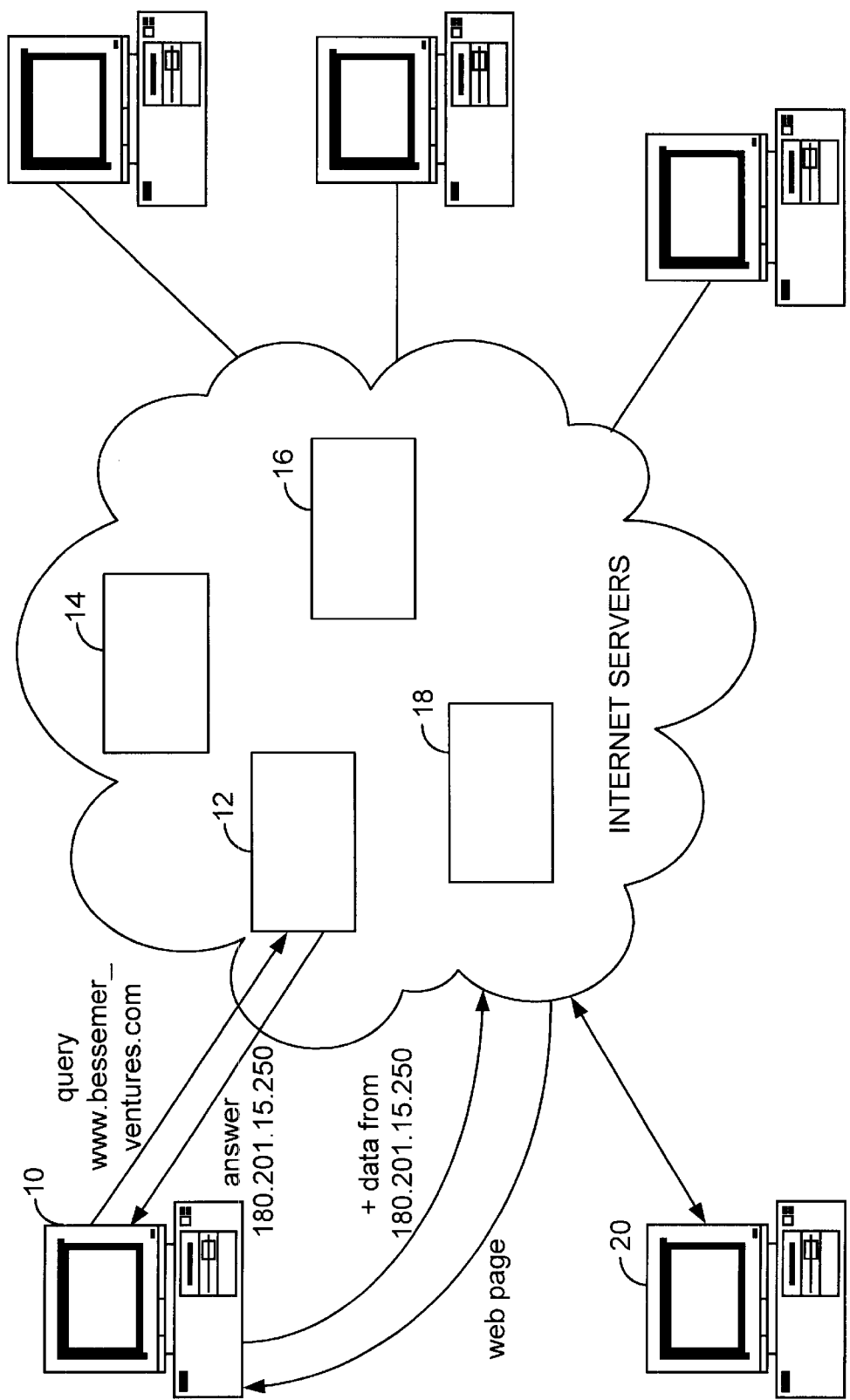
FIG. 1A illustrates a DNS lookup as performed in the prior art.
Figure 1B:
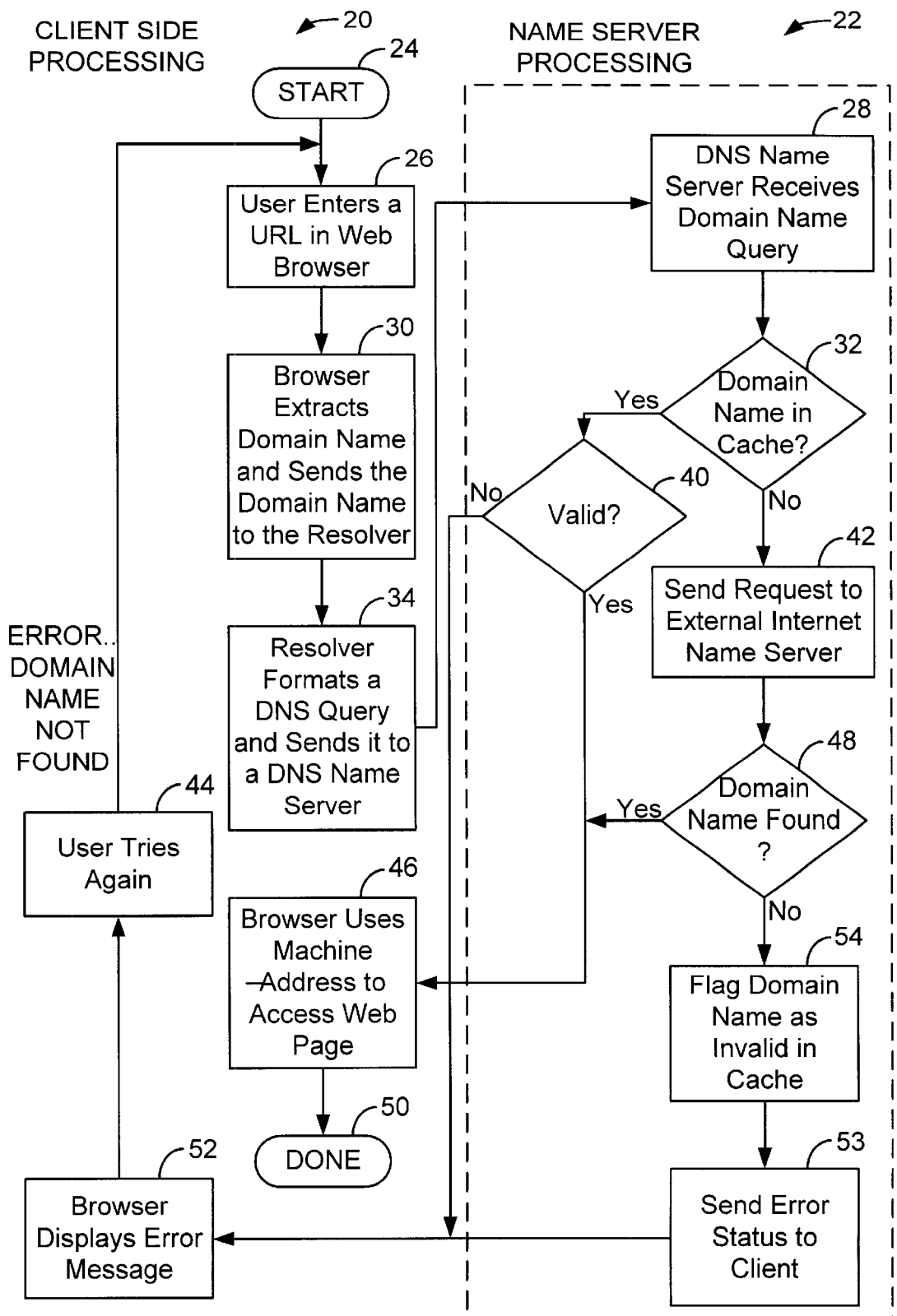
FIG. 1B illustrates the prior art's handling of valid and invalid domain name queries.
Figure 2A:
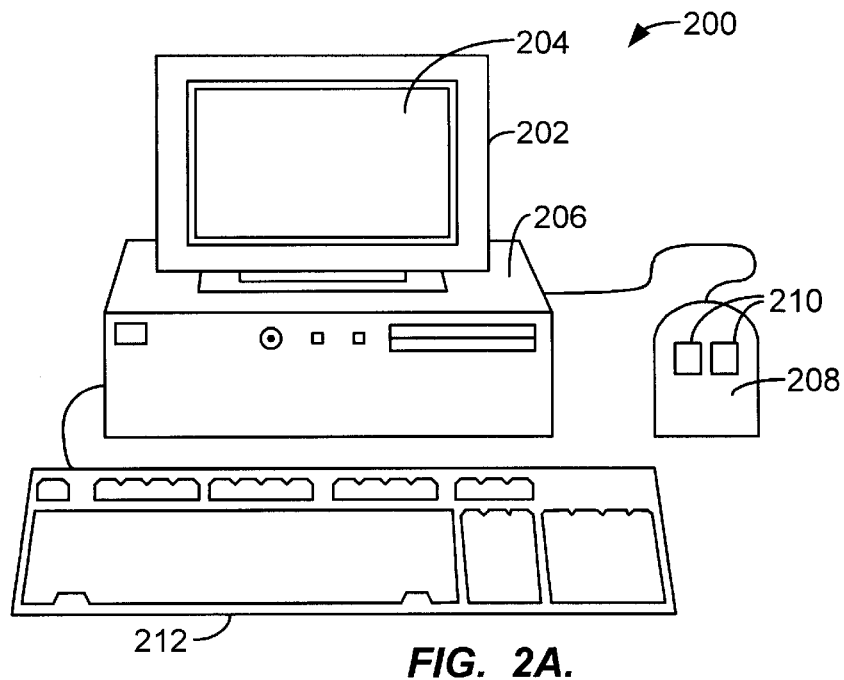
FIG. 2A shows a computer suitable for use with the present invention.
Figure 2B:
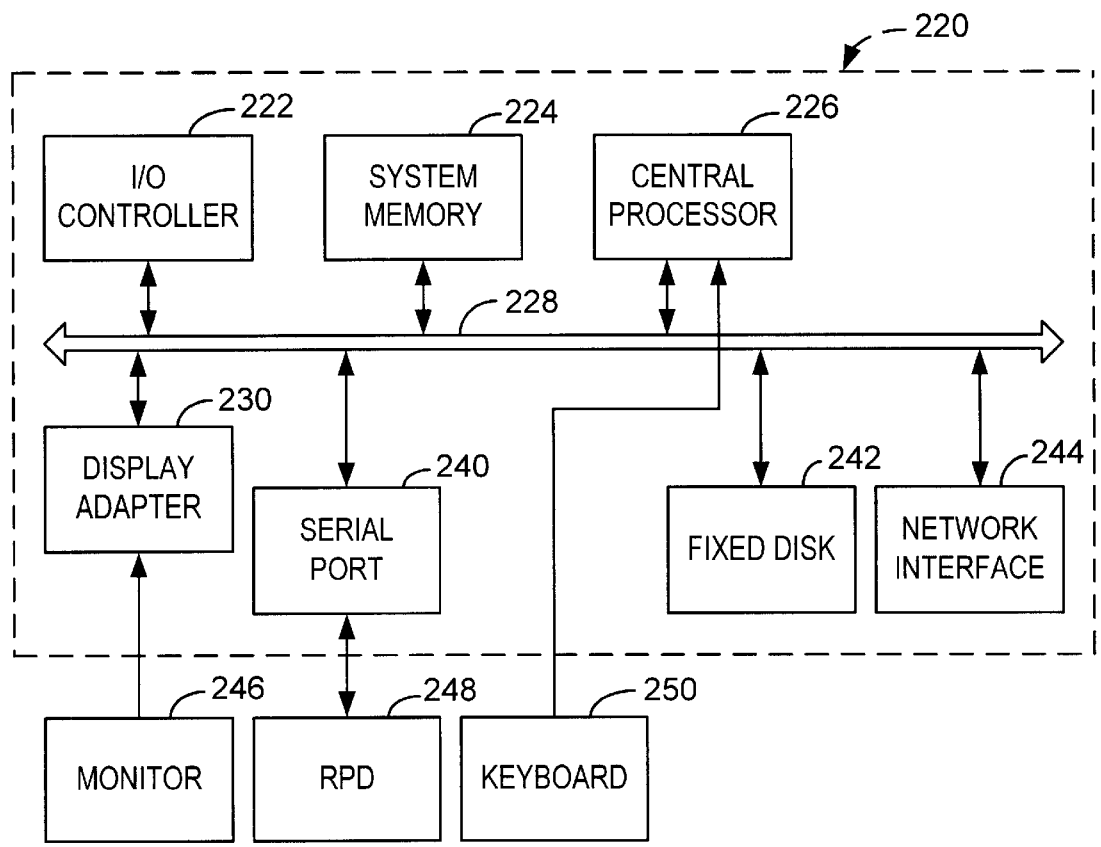
FIG. 2B shows subsystems in the computer of FIG. 2A.
Figure 2C:
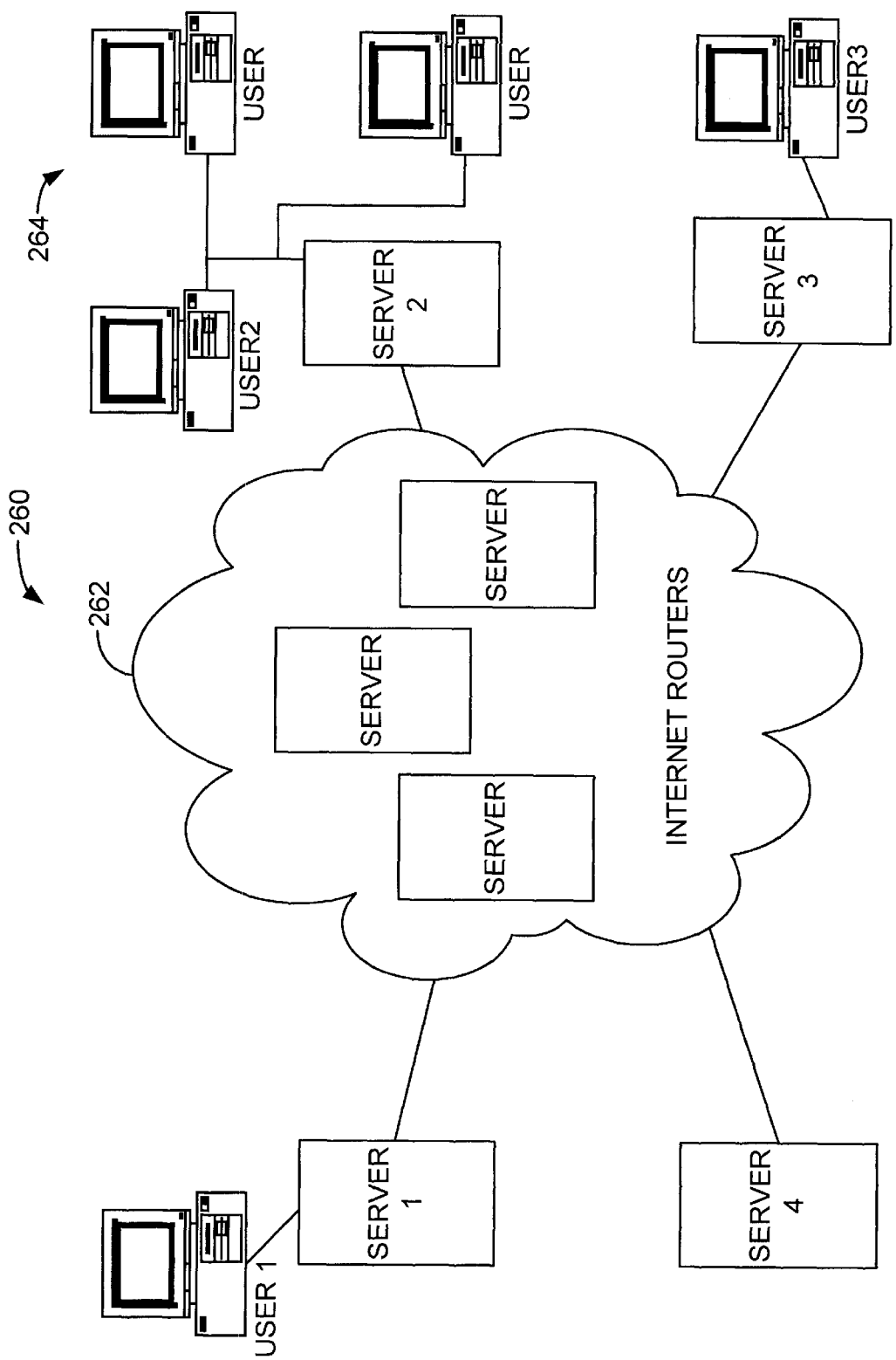
FIG. 2C is a generalized diagram of a typical network.

FIGS. 2A–C illustrate basic hardware components suitable for practicing the present invention.

FIG. 2A is an illustration of computer system 200 including display 202 having display screen 204. Cabinet 206 houses standard computer components (not shown) such as a disk drive, CDROM drive, display adapter, network card, random access memory (RAM), central processing unit (CPU), and other components, subsystems and devices. User input devices such as mouse 208 having buttons 210, and keyboard 212 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe).

Any hardware platform suitable for performing the processing described herein is suitable for use with the present invention.

FIG. 2B illustrates subsystems that might typically be found in a computer such as computer 200.

In FIG. 2B, subsystems within box 220 are directly interfaced to internal bus 228. Such subsystems typically are contained within the computer system such as within cabinet 206 of FIG. 2A. Subsystems include input/output (I/O) controller 222, System Memory (or "RAM") 224, CPU 226, Display Adapter 230, Serial Port 240, Fixed Disk 242, Network Interface Adapter 244. The use of bus 228 allows each of the subsystems to transfer data among subsystems and, most importantly, with the CPU. External devices can communicate with the CPU or other subsystems via bus 228 by interfacing with a subsystem on the bus. Thus, Monitor 246 connects with Display Adapter 230, a relative pointing device (e.g. a mouse) connects through Serial Port 240.

Some devices such as Keyboard 250 can communicate with the CPU by direct means without using the main data bus as, for example, via an interrupt controller and associated registers. As with the external physical configuration shown in FIG. 2A, many subsystem configurations are possible. FIG. 2B is illustrative of but one suitable configuration.

Subsystems, components or devices other than those shown in FIG. 2B can be added. A suitable computer system can be achieved without using all of the subsystems shown in FIG. 2B. For example, a standalone computer need not be coupled to a network so Network Interface 244 would not be required. Other subsystems such as a CDROM drive, graphics accelerator, etc. can be included in the configuration without affecting the performance of the system of the present invention.

FIG. 2C is a generalized diagram of a typical network.

In FIG. 2C, network system 260 includes several local networks coupled to the Internet. Although specific network protocols, physical layers, topologies, and other network properties are presented herein, the present invention is suitable for use with any network.

In FIG. 2C, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 262. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line. Similarly, other computers at 264 are shown utilizing a local network at a different location from USER1 Computer. The computers at 264 are coupled to the Internet via Server2. USER3 and Server3 represent yet a third installation.

Figure 3:
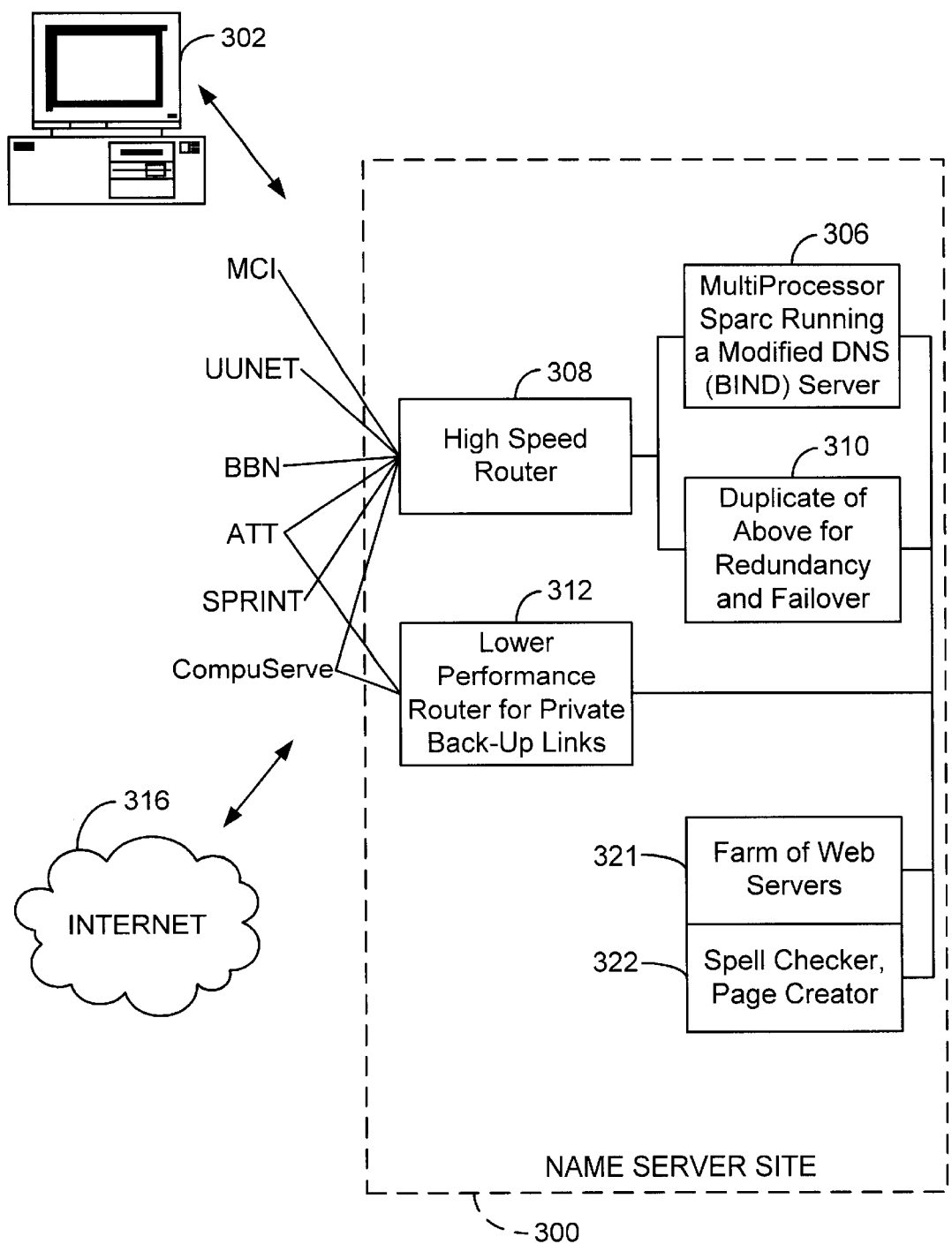
FIG. 3 shows the operation of a name server of the present invention.

FIG. 3 shows the operation of a name server of the present invention.

Name server 300 is one of many name servers on the Internet. The vast array of Internet users, computers, software and communication devices is shown symbolically at 316 while a single Internet user 302 is identified for purposes of discussion. Generally, the communication link between the Internet 316 and name server site 300, and between client 302 and name server 300, is the same link. There may be a pool of a certain type of link, such as T1 or T3 lines; or there may be alternate physical links such as satellite, cable TV, fiber optic, etc. Neither the physical link to the Internet, nor the number, type or operation of devices on the Internet is critical to the operation of the present invention.

A user's client computer is directed to use a predetermined name server for DNS lookup. This is done by designating the machine address of a name server as the primary DNS name server. When an application running on the client computer, such as an Internet browser, desires to access information at another computer on the Internet, the client computer submits a domain name query to a domain name server. Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some machines, such as "full tower" personal computers, workstations, or the like, are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines. A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware. Although a software process or program of the present invention may be presented as a single entity, such software is readily able to be executed on multiple machines. That is, there may be multiple instances of a given software program, the program may be executing in a distributed processor environment, parts of a single program may be executing on different physical machines, etc. Further, two different programs, such as a client and server program, can be executing in a single machine, or in different machines. A single program can be operating as a client for one information transaction and as a server for a different information transaction.

In FIG. 3, name server site 300 includes hardware used to communicate with client users, such as client 302, and other computers on the Internet represented at 316. Server site 300 is a SuperDNS server site having superior ability to respond to DNS lookup requests. In general, response times for valid DNS lookups are kept to a minimum by the use of a large number of communications links, multi-tiered router approach, multiple DNS servers, large capacity name caching and constant updating of authoritative DNS lists. Response times for invalid DNS lookup requests are also kept to a minimum by benefit of these techniques in addition to providing the user with assistance when an invalid DNS lookup request is received.

Reception and transmission of IP traffic is via high-speed and low-speed routers 308 and 312, respectively, which interface to the Internet through Internet Service Providers (ISPs) such as MCI, UUNET, BBN, ATT, SPRINT and CompuServe. High-speed router 308 is used to handle the majority of general requests from clients specifying the SuperDNS server site as their DNS lookup site. Lower-performance router 312 is used for direct communication with additional SuperDNS sites to maintain consistency and remote management. Lower-performance router 312 provides redundancy for monitoring and management purposes and also provides another link in case of catastrophic failure of the high speed router. Both routers 308 and 312 are connected with, and have access to, other devices at the site. Lower-performance router 312 is also used for private use. For example, one application is to link the private internal networks (320 in FIG. 3) of multiple SuperDNS sites together to create a virtual private network (VPN).

When a DNS name query, or lookup request, is received by a router, the query is sent to DNS server 306. DNS server 306 runs a modified version of BIND to resolve DNS queries. This modified DNS implements features of the present invention in custom software instructions incorporated with public domain software that is widely available. This allows the modified DNS software to substitute for responses that would normally have been returned by the public domain, unmodified, DNS software.

For example, where BIND would return a specific type A, class IN response to indicate a non-existent domain name, the modified DNS software, instead, returns the IP address of a server in a server "farm" of web servers 321. The chosen IP address is the address of the least-busy (or predicted to be least busy) server in the farm. Simultaneously, a request is sent to spell checking and web page creation computers 322. The spell checking and web-page creation computers try to determine valid likely domain names that the user may have intended. The assistance information is formed into a web page and is sent to the chosen IP in the farm. Because of the parallel processing of sending the IP address to the user's computer, performing the spell checking and forming the web page, it is likely that the web page will be present on the chosen server before the user's computer queries the chosen computer for the web page, thus reducing the time required for an overall response.

Although specific functions such as web page creation, spell checking and temporary web page serving are discussed with respect to a specific computer or machine, these functions can easily be performed at a different machine or can be distributed over two or more machines. For example, the spell checking function can be incorporated into a client-based spellchecker that is run on the user's own computer system.

In the preferred embodiment, the step of forming the web page includes the step of of inserting information or advertisements onto the page, such as a web ad banner.

Figure 4:
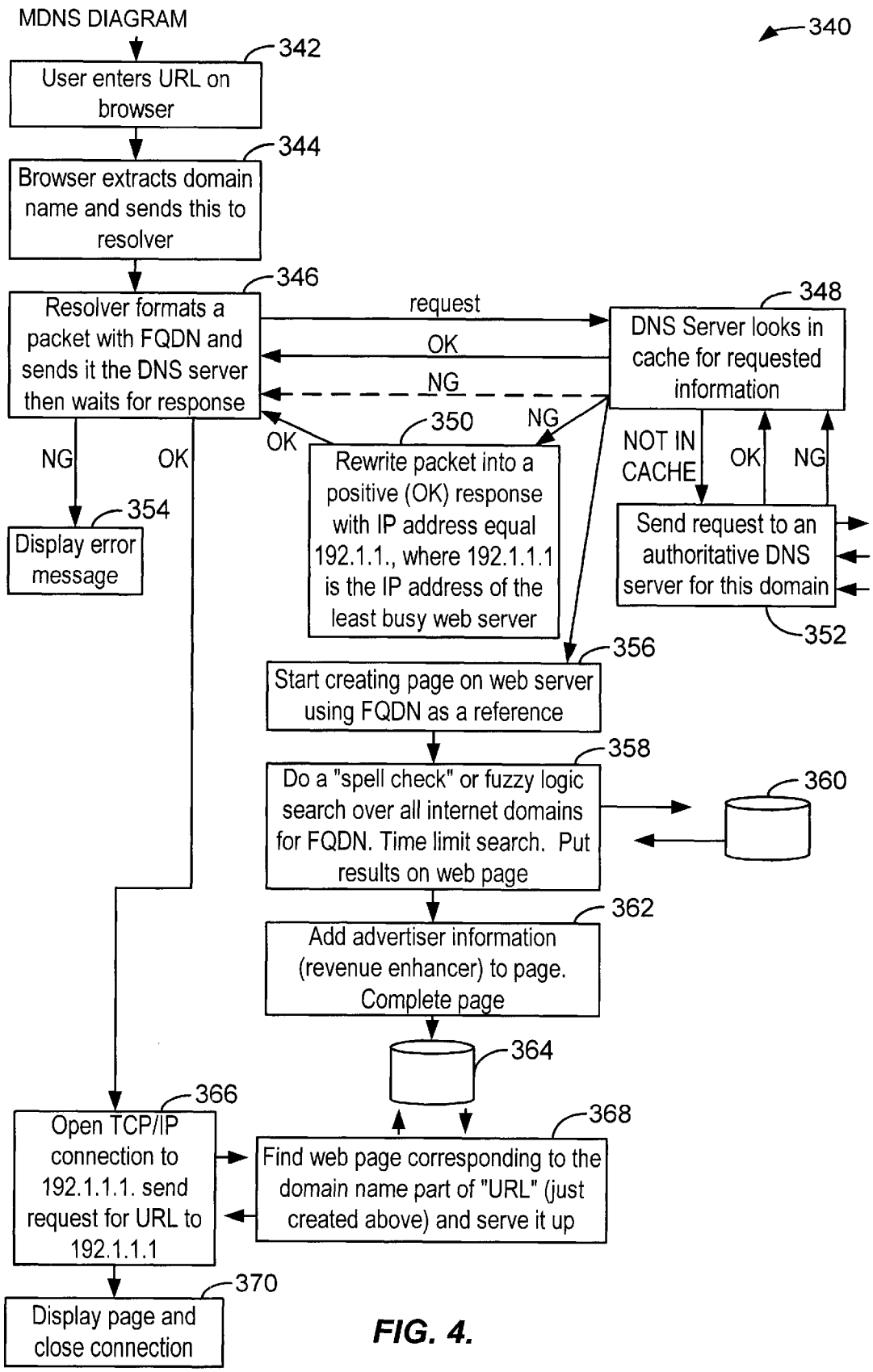
FIG. 4 shows a flowchart of the steps involved in resolving a DNS name query according to the present invention.

FIG. 4 shows a flowchart of the steps involved in resolving a DNS name query according to the present invention.

In FIG. 4, flowchart 340 begins at step 342 where a user enters a URL into a browser application. Since valid DNS name queries are handled in a manner similar to the prior art, only a request for a invalid domain name is described here. Next, at step 344, the browser extracts the domain name and transfers the name to a resolver. At step 346, the resolver formats a packet with a fully-qualified domain name and sends the request to a DNS server at the DNS server site of the present invention described above in connection with FIG. 3. At step 348, the DNS server receives the request and checks its cache for the requested information. Assuming the domain name is not in the cache, step 352 is performed to query external DNS name servers for the machine address corresponding to the DNS name queried. In the case where the invalidity of the DNS name desired is determined from other Internet name servers, the invalid name is stored in the cache and flagged as invalid. If, on the other hand, the invalid name already existed in the cache, step 352 of checking the Internet would not be performed.

After determining that the name is invalid, step 350 is performed to rewrite a packet into a positive response for the resolver. That is, the DNS name server of the present invention responds to an invalid DNS name query by giving the non-standard reply that the domain name is valid and is associated with a machine address. This machine address is referred to here as a "temporary" machine address. The temporary machine address provided is the machine address of a server that creates "temporary" web pages to recommend other DNS names to the user. In FIG. 3, the server creating the temporary web pages is at 321. In the example of FIG. 4, the temporary machine address 192.1.1.1 is provided to the resolver.

A preferred embodiment of the invention uses multiple servers for creating temporary web pages in order to improve the response times. A determination is made prior to, or at the time of, providing a temporary machine address to the resolver as to which of the three servers to provide. This can be determined on a round-robin basis, on the basis of which server is the least busy, etc. Also, temporary web pages can be cached within each server, or within other storage, so that popular invalid names will have temporary web pages already existing. However, the preferred embodiment does not typically cache the temporary web pages for long periods of time, preferring, instead, to place a short time limit of about 5 minutes on the duration that temporary web pages are kept on the servers. An "unaccessed timeout" mechanism may also be put in place to more finely control the lifetime. This would be more effective in cases where the page may be accessed multiple times from multiple users such as would be the case for a "popular" misspelling.

When the resolver receives the temporary machine address, back at step 346, step 366 is executed to access the temporary machine address by, for example, obtaining the default web page at the temporary machine. Note that provision exists for optionally triggering an error message at the user's computer. That is, the "NG" signal can be sent back to the resolver, as would be the behavior of a prior art name server system, so that the user's browser takes predefined action to indicate to the user that the name is an invalid name. In other words, the prior art would not perform step 350 and send a temporary machine address to the resolver. Instead, an error message, indicated at step 354, would be the only result of an invalid name query. This mechanism can still be invoked by the system of the present invention, as desired, although, generally, it will be preferable to "trick" the resolver into obtaining the temporary web page as an aid to the user by providing recommendations.

Concurrently with providing a temporary machine address to the resolver, the server site of the present invention begins creating a temporary web page that includes recommendations on the site name that the user desires. To this end, step 356 is executed to immediately begin constructing the web page. This concurrent construction of a temporary web page while transmission, and client-side processing to request the temporary web page, are continuing ultimately saves time in the overall transaction. Step 358 is executed to perform recommendation analysis based on the invalid domain name. The types of analysis can include a spelling check to see whether the invalid domain name is one or a few characters different from a valid domain name. This can include statistics on frequent human misspellings; mis-typings based on the QWERTY keyboard, data entry errors based on common interfaces such as palmtop computers, phonetic misspellings, etc. Another analysis can include checking all Internet domains at this point in time for a similar valid domain name. Typically such a search is time consuming and would have a time limit. Another analysis can include checking for past query histories of invalid domain names to see whether the current invalid domain name has been resolved before. Another analysis can include a look at each sub-domain in the invalid name to determine if a single sub-domain, directory, file, etc., in a multi-part URL is likely in error. Other types of analysis are possible in order to provide the user with intelligent recommendations as to possibly desired names. The system can use external storage, such as 360, external processors (not shown), human-assisted intervention (not shown), or other means to aid the user.

Step 362 adds an advertisement, sponsorship, or other "revenue enhancer" to the temporary web page. Typically, this can be a web banner ad that includes a link to another website. However, other information can be provided. Such an ad can be tailored to the subject of the user's invalid, or intended (if discernable) DNS domain name. When the temporary web page is fully created, it is stored in a storage device such as 364. Most popular browsers pass a full URL, including the misspelled domain name, in the initial request. This information is used to look up the temporary web page in the database. Multiple hosts can access the same page without having to create a new page for the same misspelled (or otherwise invalid) URL. Alternatively, where browsers do not provide full information about the URL query, including the misspelled domain name, the temporary web page can be stored with an association to the machine address of the resolver (i.e., the user's computer machine address) for auxiliary functions including associating a query for a machine address with a particular temporary web page. The resolver's machine address is known, for example, from the FQDN format of the original DNS name query.

Another use of the source IP address is for determining the end user's geographical location for purposes of targeted advertising. The use of the suffix, nondomain, portion of the full URL that is received by the browser in phase 2 of a Web page access may be used to further refine the choices and advertising returned to the user. This would fall under the second phase of analysis and not under the domain of the spell checker. For example, www.basebalxshkd.com/redsox would generate and access a temporary page to www.baseball.com (the correct, valid, and intended domain). The system of the present invention could use "redsox" to provide advertising particular to that specific baseball franchise. Also, only those baseball sites covering Boston (home of the Redsox) could be provided to the user as selections from the temporary web page.

After the resolver receives a temporary machine address at step 346, the temporary machine address is used at step 366 to request a temporary web page. Since the request uses the temporary machine address, it is directed back to a server at the SuperDNS web site and processed at step 368. Step 368 uses the domain name/URL information sent in the request generated in 366, or checks for the machine address of the requestor and matches this to existing web pages on storage device 364. If no web page exists, the browser timeout period allows the web page to be generated "on the fly" within a small amount of time. Assuming the temporary web page associated with the resolver's machine address exists, it is sent back to the resolver's machine and step 370 is executed to display the temporary web page and close the connection.

Figure 5:
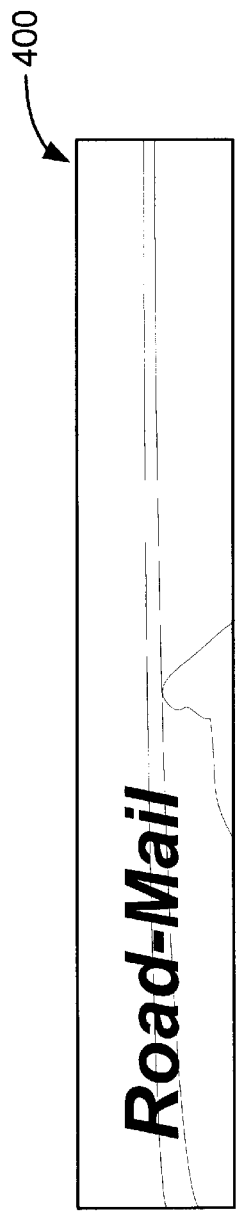
FIG. 5 shows an example screen display of a temporary web page according to the present invention.

FIG. 5 shows an example of a temporary web page display as it would appear on a user's computer screen.

In FIG. 5, banner 400 is an advertising banner. Any form of advertising or providing other auxiliary information is suitable with the present invention. Title 402 informs the user that the page is part of a service to aid the user in locating the correct, intended web page. The line at 404 indicates that the URL the user entered, namely, "http://www.infoadsaseek.com/Home" is invalid. The section of text at 406 provides the user with "best guess" alternative URLs. The URLs are provided as hyperlinks so the user need only point and click on one of the URLs to go to the URL. The text at 408 informs the user of the provider of the domain name-assistance service. Naturally, information can be added to, or deleted from, the example temporary web page of FIG. 5.

Additional refinements to the temporary web page of FIG. 5 include indicating what portions of the URL are likely invalid. For example, if the user types in the URL "www.microsoft.com/developer/toolls", the word "toolls" can be underlined, highlighted, colored, flashing or otherwise animated, etc., to indicate to the user that the rest of the URL is probably valid and that only the small portion of the URL, "toolls," is likely invalid.

Although the present invention has been described with respect to exemplary embodiments, thereof, these descriptions are but illustrative of specific embodiments of the invention. For example, although specific references were made to the DNS format of name search, the invention can be equally applied to any of the MX, TXT, PTR, CNAME, or other, DNS requests. The scope of the invention is to be determined solely by the appended claims.

What is claimed is:

1. A method for handling invalid domain name lookup requests in the Internet, the method executing in a domain name server system responsive to a target domain name request by a user computer, wherein the user computer is coupled to a display screen, the method comprising the following steps executed in the domain name server system receiving a target domain name lookup from a user computer;

searching a master lookup table to determine a machine address associated with the domain name;

determining that the target domain name does not exist within the lookup table;

transmitting a machine address to the user computer, wherein the machine address maps to a web server;

receiving a machine address request from the user computer based on the target domain name transmitted machine address to the user computer;

in response to the received machine address, sending information to the user computer to assist in that user's selection of a most likely domain name that assumes a misspelling of the target domain name; and displaying an advertisement on the user computer's display screen.

2. The method of claim 1, wherein the advertisement is a visual image.

3. The method of claim 1, wherein the advertisement is audio.

4. The method of claim 1, wherein the advertisement is an animation.

5. The apparatus of claim 1, wherein the advertisement is video.

6. The apparatus of claim 1, wherein the advertisement is a banner associated with a hyperlink to the subject of the banner.

7. The method of claim 1, wherein the user's computer includes a client-based spellchecker.

8. The method of claim 1, wherein the target domain name is a non-existent domain name.

9. The method of claim 1, wherein the target domain name is an existent but non-functioning domain.

10. The method of claim 1, wherein the domain lookup request is any one of the following types: DNS, MX, TXT, PTR or CNAME.

11. The method of claim 8, further comprising transferring information to the user's computer to cause the user's computer to display one or more valid domain names similar in spelling to the non-existent domain name.

12. The method of claim 1, further comprising transferring information to the user's computer to cause the user's computer to display a list of valid domain names, wherein the valid domain names are hyperlinked to their corresponding page on the Internet.

13. The method of claim 8, further comprising transferring information to the user's computer to cause the user's computer to display the non-existent domain name having a portion of the non-existent domain name highlighted, wherein the highlighted portion distinguishes a non-existent domain name from the one or more valid domain names.

14. The method of claim 1, further comprising transferring information to the user's computer to cause the user' computer to display auxiliary information.

15. The method of claim 14, wherein the auxiliary information is an advertisement.

16. The method of claim 14, wherein the auxiliary information is sponsorship information.

17. The method of claim 14, wherein the auxiliary information is a visual image.

18. The method of claim 14, wherein the auxiliary information is audio.

19. The method of claim 14, wherein the auxiliary information is an animation.

20. The method of claim 14, wherein the auxiliary information is video.

21. The method of claim 14, wherein the auxiliary information is a banner associated with a hyperlink to the subject of the banner.

22. The method of claim 1, wherein the target domain name is a disabled domain name.

\* \* \* \* \*